United States Patent [19]
Cahill

[11] Patent Number: 5,704,099
[45] Date of Patent: Jan. 6, 1998

[54] SEAT BELT BUCKLE WITH INERTIA LOCKING MECHANISM

[75] Inventor: Timothy J. Cahill, Dryden, Mich.

[73] Assignee: TRW Vehicle Safety Systems Inc., Lyndhurst, Ohio

[21] Appl. No.: 539,590

[22] Filed: Oct. 5, 1995

[51] Int. Cl.$^6$ .................................................. A44B 11/26
[52] U.S. Cl. ........................... 24/633; 24/641; 24/642
[58] Field of Search .......................... 24/633, 640, 642, 24/641, 639, 651

[56] References Cited

U.S. PATENT DOCUMENTS

| | | |
|---|---|---|
| 5,008,989 | 4/1991 | Wedler et al. |
| 5,067,212 | 11/1991 | Ellis |
| 5,115,543 | 5/1992 | Föhl |
| 5,133,115 | 7/1992 | Bock |
| 5,211,447 | 5/1993 | Sedlmayr et al. |
| 5,280,669 | 1/1994 | Nanbu et al. |
| 5,309,611 | 5/1994 | Wier et al. |
| 5,341,546 | 8/1994 | Burke |
| 5,357,658 | 10/1994 | Tanaka |
| 5,373,612 | 12/1994 | Kopetzky |

*Primary Examiner*—Peter M. Cuomo
*Assistant Examiner*—Hanh V. Tran
*Attorney, Agent, or Firm*—Tarolli, Sundheim, Covell, Tummino & Szabo

[57] ABSTRACT

A seat belt buckle (16) for use with a seat belt pretensioner (30) has an inertia locking mechanism (52). A latch member (64) in the buckle (16) has a locking position for engaging a seat belt locking tongue (14) to block removal of the tongue (14) from the buckle (16). A pushbutton (22) moves the latch member (64) out of the locking position against a bias of a spring (70). The inertia locking mechanism (52) includes a blocking structure (82) which moves into blocking contact with the latch member (64) in response to a predetermined amount of deceleration which occurs when the buckle (16) decelerates and stops moving under the influence of the pretensioner (30).

10 Claims, 4 Drawing Sheets

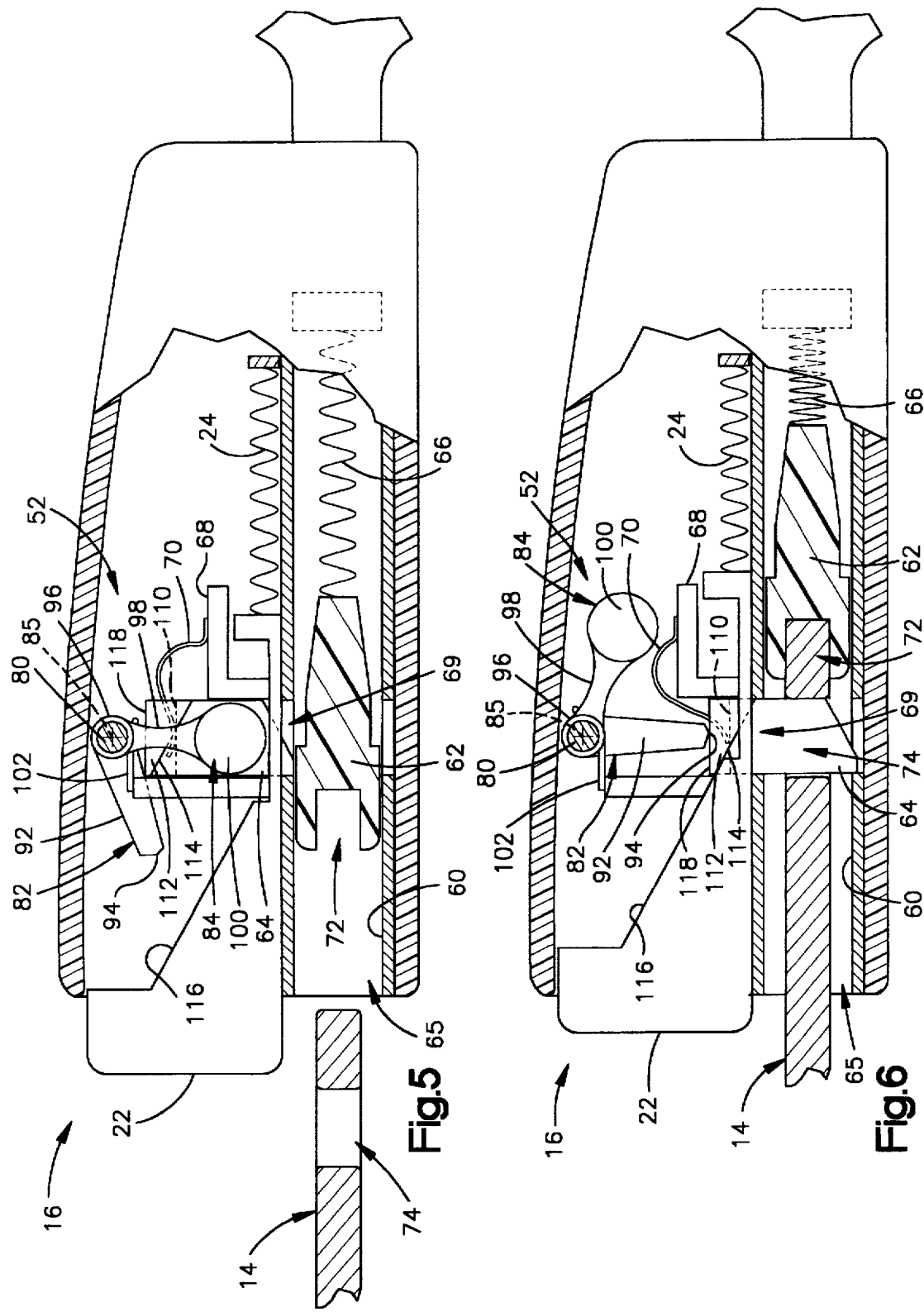

SEAT BELT BUCKLE WITH INERTIA LOCKING MECHANISM

FIELD OF THE INVENTION

The present invention relates to a seat belt buckle in which a seat belt locking tongue is inserted and locked, and particularly relates to a seat belt buckle for use with a seat belt pretensioner.

BACKGROUND OF THE INVENTION

A seat belt system for restraining a vehicle occupant typically includes seat belt webbing, a seat belt locking tongue on the webbing, and a seat belt buckle. The tongue on the webbing is inserted and locked in the buckle to secure the webbing about a vehicle occupant. Such a seat belt system may also include a seat belt pretensioner which is actuated upon the occurrence of a vehicle collision. When the pretensioner is actuated, it moves the buckle so as to pull the tongue and the webbing against the vehicle occupant. The pretensioner thus imparts tension to the webbing to help ensure that the webbing restrains movement of the vehicle occupant upon the occurrence of a vehicle collision.

SUMMARY OF THE INVENTION

In accordance with the present invention, a seat belt buckle for use with a seat belt pretensioner has first and second locking means. The first locking means releasably locks a seat belt locking tongue in the buckle. The second locking means prevents the tongue from being inadvertently released from the buckle under the influence of the pretensioner.

The first locking means comprises a movable latch member. The latch member has a locking position for engaging the tongue to block removal of the tongue from the buckle. A pushbutton moves the latch member to a non-locking position against a bias of a spring.

The second locking means blocks the latch member from moving to the non-locking position when the buckle decelerates and stops moving under the influence of the pretensioner. The second locking means comprises a blocking structure which moves into blocking contact with the latch member in response to such deceleration of the buckle.

BRIEF DESCRIPTION OF THE DRAWINGS

Further features of the present invention will become apparent to those skilled in the art to which the present invention relates from reading the following description with reference to the accompanying drawings, in which:

FIG. 5 is a side view similar to FIG. 3 showing additional parts of the buckle;

FIG. 6 is a side view similar to FIG. 5 showing parts in different positions.

DESCRIPTION OF A PREFERRED EMBODIMENT

Figure 1:
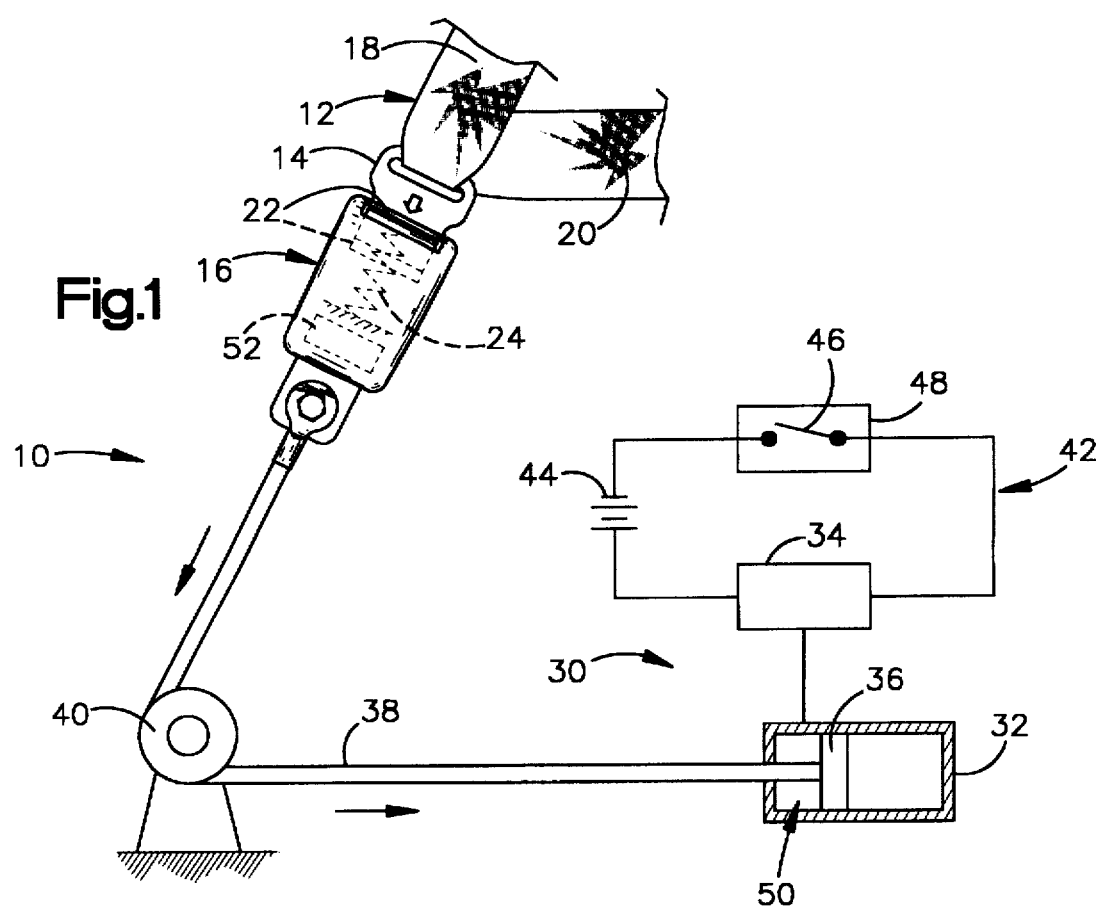
FIG. 1 is a schematic view of a vehicle occupant restraint apparatus including a seat belt buckle comprising a preferred embodiment of the present invention.

A vehicle occupant restraint apparatus 10 comprising a preferred embodiment of the present invention is shown schematically in FIG. 1. The apparatus 10 includes seat belt webbing 12, a seat belt locking tongue 14 on the webbing 12, and a seat belt buckle 16. The tongue 14 is inserted and locked in the buckle 16 when the webbing 12 has been moved about a vehicle occupant so as to define a shoulder belt 18 and a lap belt 20 on opposite sides of the tongue 14. When the tongue 14 is locked in the buckle 16, the webbing 12 can restrain movement of the occupant upon the occurrence of a vehicle collision.

The tongue 14 is released from the buckle 16 upon depression of a pushbutton 22 on the buckle 16. Specifically, the pushbutton 22 is movable from a rest position, as shown in solid lines in FIG. 1, to a release position, as shown in dashed lines in FIG. 1, against the bias of a pushbutton spring 24. The tongue 14 is released from the buckle 16 when the pushbutton 22 reaches the release position.

The apparatus 10 further includes a seat belt pretensioner 30 which is actuated upon the occurrence of a vehicle collision. When the pretensioner 30 is actuated, it imparts tension to the webbing 12 to help ensure that the webbing 12 restrains movement of the vehicle occupant. In the preferred embodiment of the present invention shown in the drawings, the pretensioner 30 includes a pressure cylinder 32 and a source 34 of fluid pressure. A piston 36 in the cylinder 32 is connected to the buckle 16 by a cable 38 extending around a pulley 40. The source 34 of fluid pressure preferably comprises a pyrotechnic gas generator which is actuatable electrically. The source 34 of fluid pressure is thus included in an electrical circuit 42.

The electrical circuit 42 further includes a power source 44 and a normally open switch 46. The power source 44 preferably comprises the vehicle battery and/or a capacitor. The switch 46 is part of a sensor 48 which senses a vehicle condition indicating the occurrence of a vehicle collision. Such a condition may comprise, for example, sudden vehicle deceleration which is caused by a collision. If the collision-indicating condition is above a predetermined threshold level, the sensor 48 closes the switch 46. Electric current then flows through the circuit 42 to actuate the source 34 of fluid pressure.

When the source 34 of fluid pressure is actuated, it pressurizes a chamber 50 adjacent to the piston 36. This causes the piston 36 to move in the cylinder 32 from left to right, as viewed in FIG. 1, and to pull the cable 38 around the pulley 40 toward the cylinder 32. The buckle 16, the tongue 14, and the webbing 12 are then pulled toward the pulley 40 by the cable 38. As a result, tension is imparted to the webbing 12 to increase the restraining effect of the webbing 12.

After the pretensioner 30 has been actuated, the piston 36 decelerates and stops moving to the right in the cylinder 32. The buckle 16 similarly decelerates and stops moving toward the pulley 40. However, the pushbutton 22 tends to continue moving inertially toward the pulley 40 when the buckle 16 decelerates and stops. The pushbutton 22 thus tends to move toward the release position in which it releases the tongue 14 from the buckle 16. In accordance with the present invention, the buckle 16 includes an inertia locking mechanism 52. As described fully below, the inertia locking mechanism 52 prevents the tongue 14 from being inadvertently released from the buckle 16 when the buckle 16 decelerates and stops moving under the influence of the pretensioner 30.

Figure 2:
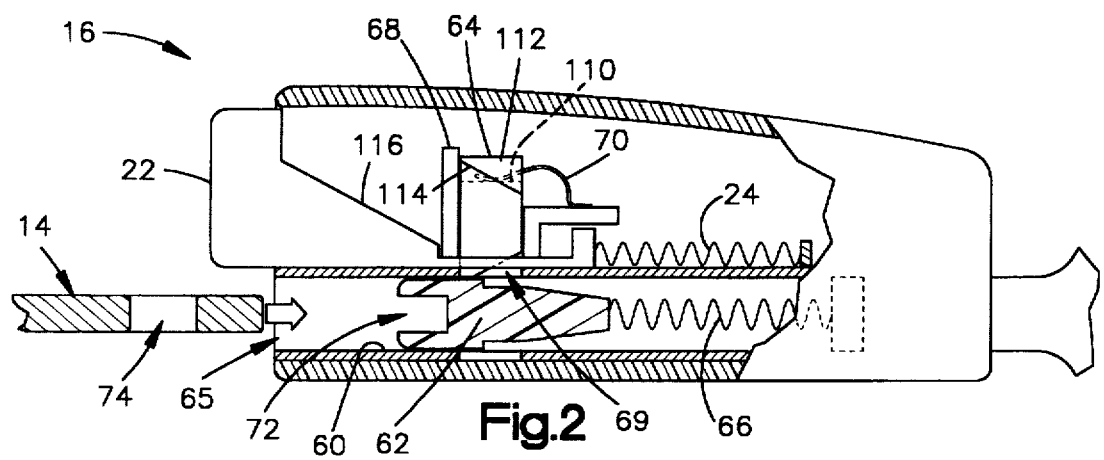
FIG. 2 a side view, partly in section, of the buckle and another part of the apparatus of FIG. 1.
Figure 3:
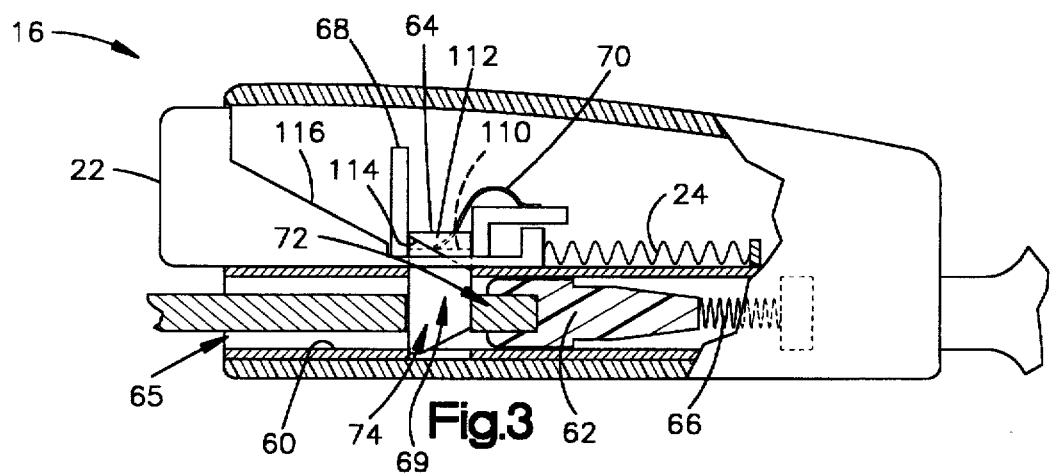
FIG. 3 is a side view similar to FIG. 2 showing parts in different positions.
Figure 4:
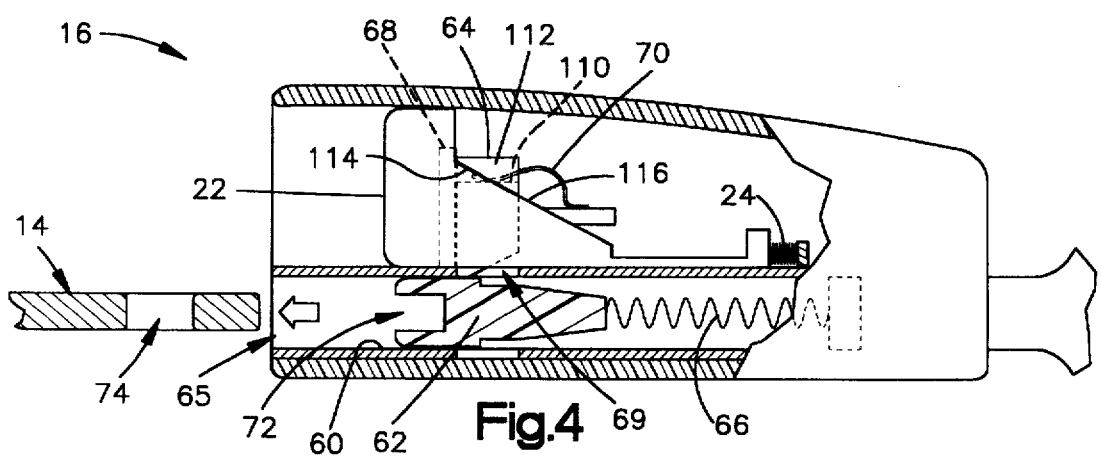
FIG. 4 is a side view similar to FIGS. 2 and 3 showing parts in different positions.

As shown in the schematic views of FIGS. 2–4, the buckle 16 has parts which cooperate with the pushbutton 22, the pushbutton spring 24, and the tongue 14 for locking and releasing of the tongue 14 in the buckle 16. Such parts of the buckle include a track member 60, an ejector 62, and a latch member 64.

The track member 60 defines a passage 65 for receiving the tongue 14. The ejector 62 is located in the passage 65, and is slidable along the passage 65 between the forward and rearward positions in which it is shown in FIGS. 2 and 3, respectively. An ejector spring 66 exerts a bias urging the ejector 62 toward the forward position.

A guide structure 68 supports the latch member 64 for movement into and across the passage 65 through an opening 69 in the track member 60. The latch member 64 is thus movable from a non-locking position above the passage 65 in the track member 60 (FIG. 2) to a locking position extending across the passage 65 in the track member 60 (FIG. 3). A latch spring 70 acts between the guide structure 68 and the latch member 64, and exerts a bias urging the latch member 64 toward the locking position. As described briefly above with reference to FIG. 1, the pushbutton 22 is movable inward of the buckle 16 from its rest position (FIGS. 2 and 3) to its release position (FIG. 4) against the bias of the pushbutton spring 24.

The ejector 62 and the latch member 64 are located in the positions of FIG. 2 before the tongue 14 is locked in the buckle 16. The latch member 64 is then supported in the non-locking position by the ejector 62 which, in turn, is held in the forward position by the ejector spring 66. When the tongue 14 is moved into the passage 65, as indicated by the arrow shown in FIG. 2, it is moved into engagement with the ejector 62 in a notch 72 formed at the forward end of the ejector 62. The tongue 14 is then moved inward against the ejector 62 so as to slide the ejector 62 to the rearward position of FIG. 3 against the bias of the ejector spring 66. As the tongue 14 approaches the position of FIG. 3, an aperture 74 in the tongue 14 moves beneath the latch member 64. The latch spring 70 then moves the latch member 64 across the passage 65 through the aperture 74 in the tongue 14. As a result, the latch member 64 extends through the aperture 74 in the tongue 14 to block removal of the tongue 14 from the buckle 16 when the latch member 64 is in the locking position.

When the pushbutton 22 is moved from the rest position (FIG. 3) to the release position (FIG. 4), it slides beneath a portion of the latch member 64 and lifts the latch member 64 upward, as viewed in the drawings, from the locking position to the non-locking position against the bias of the latch spring 70. The ejector spring 66 then slides the ejector 62 back to the forward position. The tongue 14 is thus released and ejected from the buckle 16.

Figure 7:
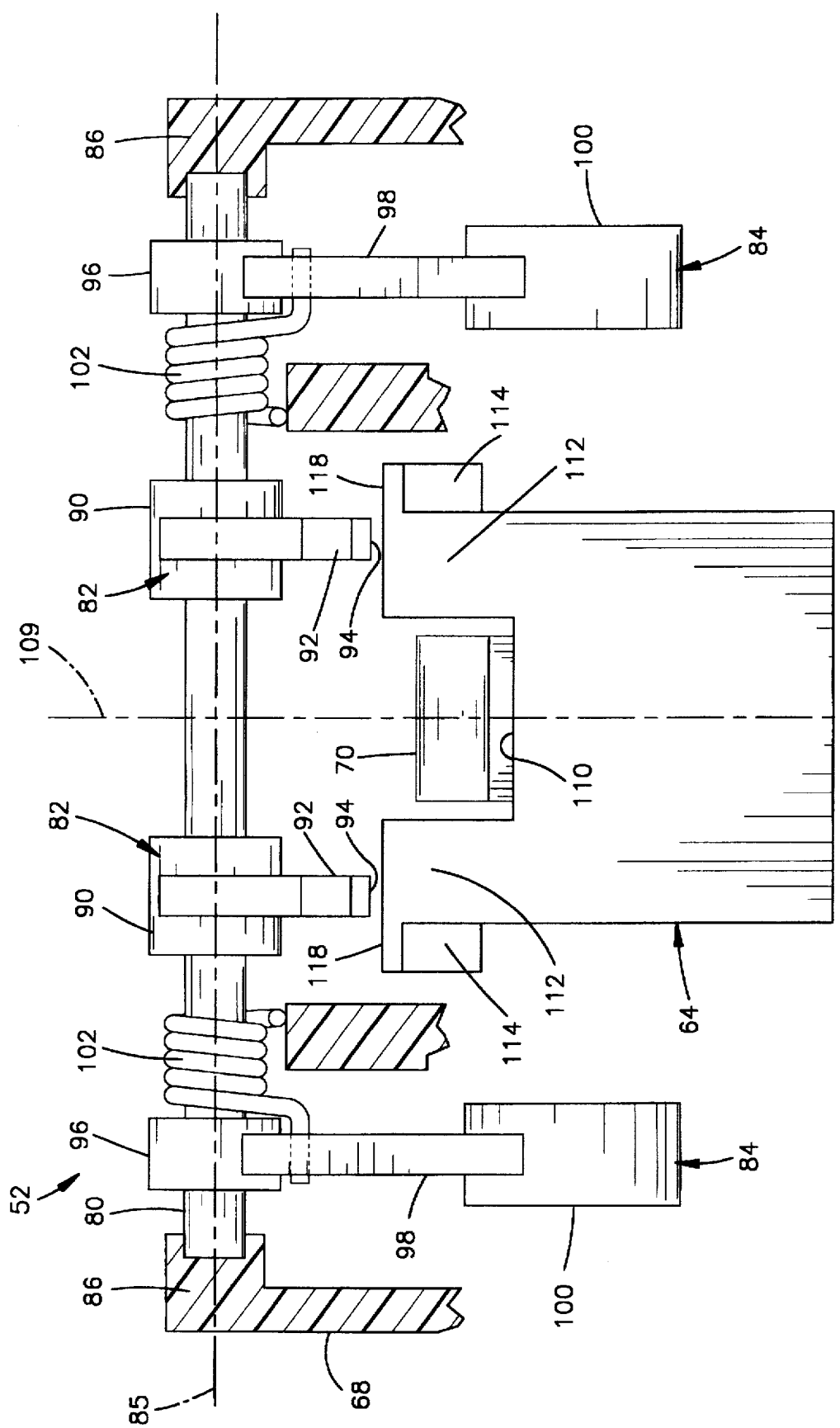
FIG. 7 is a front view of parts shown in FIGS. 5 and 6.

The inertia locking mechanism 52 is shown in greater detail in the schematic views of FIGS. 5–7. As best shown in FIG. 7, the inertia locking mechanism 52 includes a shaft 80, a pair of blocking structures 82, and pair of inertia mass structures 84. The shaft 80, the blocking structures 82, and the inertia mass structures 84 are preferably metal parts, and are all preferably formed of the same metal material.

The shaft 80 has a longitudinal central axis 85. As shown in FIGS. 5 and 6, the shaft 80 extends across the buckle 16 in a direction perpendicular to the direction in which the tongue 14 is movable into the passage 65. As shown in FIG. 7, the shaft 80 is supported at its opposite ends by a pair of bearing portions 86 of the guide structure 68. The shaft 80 is thus supported for rotation about the axis 85 relative to the guide structure 68, the latch member 64, and the other parts of the buckle 16 described above with reference to FIGS. 2–4.

The blocking structures 82 are substantially identical. Each blocking structure 82 has a short cylindrical hub 90 concentric with the shaft 80, and has an elongated blocking arm 92 projecting radially from the hub 90. Each blocking arm 92 has a radially outer end 94. The hubs 90 are fixed to the shaft 80, such as by interference fits or welds (not shown), and are spaced from each other along the axis 85 of the shaft 80. The blocking arms 92 thus project radially from the shaft 80 at locations that are spaced from each other along the axis 85. However, the blocking arms 92 are located adjacent to each other circumferentially about the axis 85.

The inertia mass structures 84 also are substantially identical. Each inertia mass structure 84 has a short cylindrical hub 96, a lever arm 98 projecting radially from the hub 96, and a mass lobe 100 at the radially outer end of the lever arm 98. The hubs 96 are fixed concentrically to the shaft 80 on axially opposite sides of the blocking structures 82. Like the blocking arms 92, the lever arms 98 project radially from the corresponding hubs 96 at circumferentially adjacent locations. However, the lever arms 98 are spaced circumferentially from the blocking arms 92.

The blocking structures 82 and the inertia mass structures 84 pivot together about the axis 85 upon rotation of the shaft 80 about the axis 85. The blocking structures 82 are thus pivotal between the unactuated positions in which they are shown in FIG. 5 and the actuated positions in which they are shown in FIG. 6.

As shown in FIG. 7, the inertia locking mechanism 52 further includes a pair of torsion springs 102. Each torsion spring 102 acts between the guide structure 68 and a corresponding one of the lever arms 98 on the inertia mass structures 84. The torsion springs 102 normally hold the inertia mass structures 84, and hence the blocking structures 82, in the positions of FIG. 5, and are stressed upon pivotal movement of those parts toward the positions of FIG. 6.

As described above with reference to FIG. 1, the pretensioner 30 moves the buckle 16 in a direction toward the pulley 40 when the pretensioner is actuated. That direction extends from left to right in the side views of FIGS. 2–6. Accordingly, as the buckle 16 decelerates and stops moving toward the pulley 40 under the influence of the pretensioner 30, the mass of the pushbutton 22 causes it to move inertially from its rest position (FIG. 2) toward its release position (FIG. 4). The mass of the mass lobes 100 similarly causes them to move inertially from left to right when the buckle 16 decelerates and stops moving. This causes the inertia mass structures 84, the shaft 80, and the blocking structures 82 to move about the axis 85 in a counterclockwise direction, as viewed in FIG. 5, against the bias of the torsion springs 102.

The combined mass of the two mass lobes 100 is designed specifically to cause the blocking structures 82 to pivot fully to the actuated positions of FIG. 6 in response to a predetermined amount of deceleration of the buckle 16 which occurs when the buckle 16 decelerates and stops moving toward the pulley 40 under the influence of the pretensioner 30. When the blocking structures 82 are thus moved pivotally to their actuated positions, the blocking arms 92 are moved into the path of movement of the latch member 64. The blocking arms 92 then block the latch member 64 from moving to its non-locking position (FIG. 2) when the pushbutton 22 moves inertially beneath the latch member 64 and lifts the latch member 64 upward into contact with the ends 94 of the blocking arms 92, as shown in FIG. 6.

In the preferred embodiment of the present invention described above, the pushbutton 22, the latch member 64, and the latch spring 70 in the buckle 16 have structures which are substantially similar to the structures of corresponding parts of the buckle disclosed in U.S. Pat. No. 5,067,212, entitled SEAT BELT BUCKLE, and assigned to TRW Vehicle Safety Systems Inc. As shown in FIG. 7, the buckle 16 has a transverse centerline 109 which is perpendicular to the axis 85 of the shaft 80. The latch member 64 is symmetrical with respect to the centerline 109. The latch spring 70 engages the latch member 64 at a recessed upper surface 110 of the latch member 64. The recessed upper surface 110 is located between a pair of upwardly projecting shoulder portions 112 of the latch member 64 which are equally spaced from the centerline 109. Each shoulder portion 112 has an inclined lower surface 114. The pushbutton 22 has a corresponding pair of inclined upper surfaces 116, one of which is shown in FIGS. 2–6, for engagement with the inclined lower surfaces 114 of the latch member 64 upon movement of the pushbutton 22 toward its release position.

Each shoulder portion 112 of the latch member 64 further has a substantially horizontal upper surface 118. When the inertia locking mechanism 52 is actuated, as described above, the radially outer ends 94 of the blocking arms 92 are moved into blocking contact with the latch member 64 at the upper surfaces 118 of the shoulder portions 112. In accordance with this feature of the present invention, the blocking structures 82 are equally spaced a first distance from the centerline 109 of the buckle 16. The inertia mass structures 84 are equally spaced a second, greater distance from the centerline 109. The inertia locking mechanism 52 is thus symmetrical with respect to the centerline 109 so that mass of the inertia locking mechanism 52 is balanced across the buckle 16.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
a vehicle seat belt buckle having first locking means for releasably locking a seat belt tongue in said buckle, said first locking means comprising a movable latch member having a locking position for engaging the tongue to block removal of the tongue from the buckle, a spring, and a pushbutton for moving said latch member from said locking position to a non-locking position against a bias of said spring;
said buckle further comprising second locking means for blocking movement of said latch member from said locking position to said non-locking position upon the occurrence of a predetermined amount of deceleration of said buckle, said second locking means comprising a blocking structure for moving into contact with said latch member and blocking movement of said latch member from said locking position in response to said predetermined amount of deceleration of said buckle.

2. Apparatus as defined in claim 1 wherein said blocking structure moves pivotally into said blocking contact with said latch member, said second locking means further comprising an inertia mass structure, bearing means for supporting said inertia mass structure for pivotal movement in response to said deceleration of said buckle, and shaft means for moving said blocking structure pivotally in response to said pivotal movement of said inertia mass structure.

3. Apparatus as defined in claim 2 wherein said bearing means supports said shaft means for rotation about a longitudinal central axis of said shaft means, said blocking structure and said inertia mass structure both projecting radially from said shaft means and being fixed to said shaft means for pivotal movement about said axis upon rotation of said shaft means about said axis.

4. Apparatus as defined in claim 3 wherein said second locking means comprises a torsion spring which engages said inertia mass structure to resist said pivotal movement of said inertia mass structure.

5. Apparatus as defined in claim 3 wherein said blocking structure comprises a blocking arm having a radially outer end which moves pivotally into said blocking contact with said latch member, said inertia mass structure comprising a lever arm and a mass lobe at a radially outer end of said lever arm.

6. Apparatus comprising:
a vehicle seat belt buckle having first locking means for releasably locking a seat belt tongue in said buckle, said first locking means comprising a movable latch member having a locking position for engaging the tongue to block removal of the tongue from the buckle, a spring, and a pushbutton for moving said latch member from said locking position to a non-locking position against a bias of said spring;
said buckle further comprising second locking means for blocking movement of said latch member from said locking position to said non-locking position upon the occurrence of a predetermined amount of deceleration of said buckle;
said second locking means comprising a blocking structure which moves into blocking contact with said latch member in response to said predetermined amount of deceleration, said blocking structure moving pivotally into said blocking contact with said latch member;
said second locking means further comprising an inertia mass structure, bearing means for supporting said inertia mass structure for pivotal movement in response to said deceleration of said buckle, and shaft means for moving said blocking structure pivotally in response to said pivotal movement of said inertia mass structure, said bearing means supporting said shaft means for rotation about a longitudinal central axis of said shaft means, said blocking structure and said inertia mass structure both projecting radially from said shaft means and being fixed to said shaft means for pivotal movement about said axis upon rotation of said shaft means about said axis, said blocking structure being one of a pair of substantially identical blocking structures projecting radially from said shaft means at locations that are spaced axially from each other, said inertia mass structure being one of a pair of substantially identical inertia mass structures projecting radially from said shaft means at locations that are spaced axially from each other.

7. Apparatus as defined in claim 6 wherein said inertia mass structures are offset from said blocking structures circumferentially about said axis.

8. Apparatus as defined in claim 6 wherein said buckle has a centerline perpendicular to said axis, said blocking structures being equally spaced a first distance from said centerline along said axis, said inertia mass structures being equally spaced a second, greater distance from said centerline along said axis.

9. Apparatus as defined in claim 6 wherein said spring engages said latch member at a recessed surface of said latch member, said blocking members being movable into said blocking contact with said latch member at respective shoulder surfaces of said latch member on axially opposite sides of said recessed surface.

10. Apparatus comprising:

a vehicle seat belt buckle having first locking means for releasably locking a seat belt tongue in said buckle, said first locking means comprising a movable latch member having a locking position for engaging the tongue to block removal of the tongue from the buckle, a spring, and a pushbutton for moving said latch member from said locking position to a non-locking position against a bias of said spring;

said buckle further comprising second locking means for blocking movement of said latch member from said locking position to said non-locking position upon the occurrence of a predetermined amount of deceleration of said buckle;

said second locking means comprising a blocking structure which moves into blocking contact with said latch member in response to said predetermined amount of deceleration, said blocking structure moving pivotally into said blocking contact with said latch member;

said second locking means further comprising an inertia mass structure, bearing means for supporting said inertia mass structure for pivotal movement in response to said deceleration of said buckle, and shaft means for moving said blocking structure pivotally in response to said pivotal movement of said inertia mass structure, said bearing means supporting said shaft means for rotation about a longitudinal central axis of said shaft means, said blocking structure and said inertia mass structure both projecting radially from said shaft means and being fixed to said shaft means for pivotal movement about said axis upon rotation of said shaft means about said axis, said blocking structure and said inertia mass structure projecting radially from said shaft means at locations that are spaced axially from each other.

* * * * *